Oct. 3, 1967          H. W. DIETERT          3,344,877
GRANULAR MATERIAL WEIGHER COMPENSATED FOR CHANGES
IN MATERIAL PROPERTIES BESIDES WEIGHT
Filed June 10, 1966
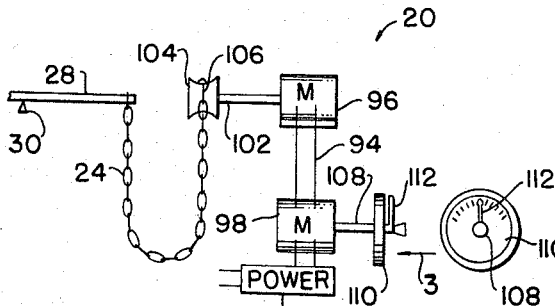
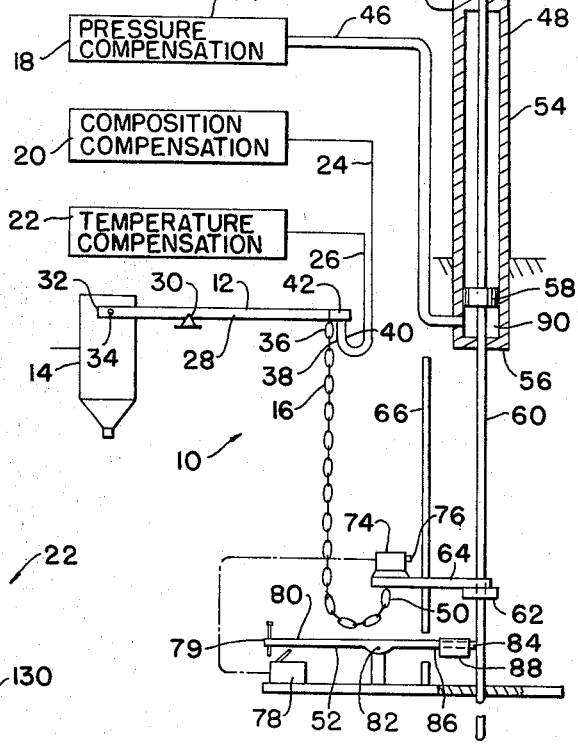
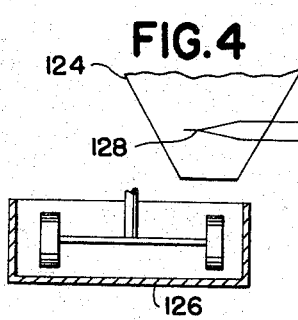
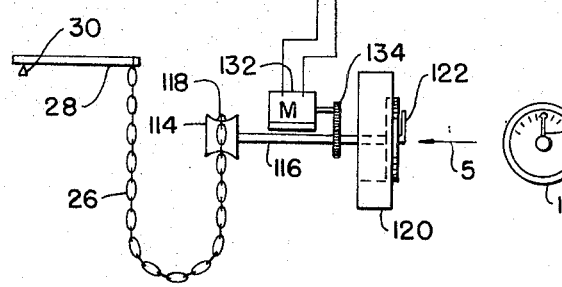
*INVENTOR.*
HARRY W. DIETERT
ATTORNEYS

United States Patent Office 3,344,877
Patented Oct. 3, 1967

3,344,877
GRANULAR MATERIAL WEIGHER COMPENSATED FOR CHANGES IN MATERIAL PROPERTIES BESIDES WEIGHT
Harry W. Dietert, Kerrville, Tex., assignor to Harry W. Dietert Co., Detroit, Mich., a corporation of Michigan
Filed June 10, 1966, Ser. No. 556,612
10 Claims. (Cl. 177—64)

This application is a continuation-in-part of application Ser. No. 391,420, filed Aug. 24, 1964, now abandoned which is a continuation-in-part of application Ser. No. 259,069, filed Feb. 18, 1963, now Patent No. 3,168,926.

The invention relates to weighing apparatus and refers more specifically to structure for compensating a balance beam or the like whereby the quantity of material weighed by the balance beam necessary to balance the beam is automatically varied in accordance with properties of the material weighed.

In many instances it is desirable to vary the quantity of material weighed in an automatic weighing cycle in accordance with the physical properties of the material weighed or related material with which the material weighed is to be mixed. For example, in foundry operations it is desirable to conditions foundry sand by the addition of additives, such as bonding agents thereto. The quantity of additives added to the foundry sand should be varied in accordance with the physical properties of the sand, such as the shear or compressive strength, composition such as the shear or compressive strength composition and temperature.

It is therefore an object of the present invention to provide improved weighing apparatus.

Another object is to provide weighing apparatus including improved structure for compensating the weighing apparatus in accordance with the physical properties of the material weighed.

Another object is to provide a weighing apparatus including a balance beam, means for receiving material to be weighed at one end of the balance beam, and a flexible, linear member having substantial weight one end of which is connected to the other end of the balance beam and means for moving the other end of the flexible, linear member toward and away from the other end of the balance beam transversely thereof in accordance with a property of the material to be weighed.

Another object is to provide structure as set forth above wherein the property of the material is the strength of the material as determined by pressure required to rupture a sample of the material.

Another object is to provide structure as set forth above wherein the property of the material is composition of the material.

Another object is to provide structure as set forth above wherein the property of the material is temperature of the material.

Another object is to provide structure as set forth above wherein the means for moving the other end of the flexible linear member comprises a drum to which the other end of the flexible linear member is secured and means for rotating the drum to wind the flexible linear member on the drum in accordance with the property of the material.

Another object is to provide compensating structure for weighing apparatus which is simple in construction, economical to produce and efficient in use.

Other objects and features of the invention will become apparent as the description proceeds, especially when taken in conjunction with the accompanying drawings, illustrating a preferred embodiment of the invention, wherein:

FIGURE 1 is a diagrammatic illustration of weighing apparatus including compensating structure constructed in accordance with the invention.

FIGURE 2 is a diagrammatic illustration of structure for compensating weighing apparatus, such as illustrated in FIGURE 1, in accordance with the composition of the material weighed.

FIGURE 3 is an elevation view of the indicator portion of the compensating structure illustrated in FIGURE 2 taken in the direction of arrow 3 in FIGURE 2.

FIGURE 4 is a diagrammatic illustration of structure for compensating weighing apparatus, such as illustrated in FIGURE 1 in accordance with the temperature of the material to be weighed.

FIGURE 5 is an elevation view of the indicator portion of the compensating structure illustrated in FIGURE 4 taken in the direction of arrow 5 in FIGURE 4.

With particular reference to the figures of the drawing, one embodiment of the present invention will now be disclosed in detail.

The weighing apparatus 10 illustrated in FIGURE 1 includes the balance 12 and the weigh hopper 14 at one end of the balance 12. The linear flexible member 16 secured to the other end of the balance 12 is included in the compensating structure 18 for varying the quantity of material weighed by the balance 12 in accordance with the strength of the material being prepared or processed. Structures 20 and 22 compensate the weighing apparatus 10 in accordance with the composition and temperature of material weighed thereby.

Thus, in for example a foundry operation, the physical properties of granular material, such as sand, to which it is necessary to add additives to provide predetermined physical properties are sensed by the compensating structures 18, 20 and 22, and the flexible linear members 16, 24 and 26 are adjusted in accordance with the sensed physical properties of the sand to provide more or less weight on the end 42 of the balance 12. The quantity of additive necessary in the hopper 14 to balance the balance 12 is thus varied in accordance with the physical properties of the sand, for example green strength.

More specifically the balance 12 includes the balance beam 28 and the pivot mounting 30 therefor, which is positioned centrally thereof. The weigh hopper 14 is supported from the end 32 of the balance beam 28 by the pivot structure 34, as shown best in FIGURE 1. The ends 36, 38 and 40 of the chains 16, 24 and 26 are secured to the other end 42 of the balance beam 28.

The compensating structure 18 for varying the length of chain 16 which is supported from the end 42 of balance beam 28 includes apparatus 44 for physically testing a sample of foundry sand to determine its strength, such as the physical properties testing apparatus illustrated in Patent No. 3,168,926. This apparatus will not be considered in detail herein, but provides a pressure in conduit 46 proportional to the physical strength of the material tested.

Structure 18 further includes the mechanism 48 for moving the end 50 of the chain 16 toward the end 42 of the balance beam 28 transversely thereof in a vertical direction. The structure 52 for securing the end 50 of the chain 16 in a predetermined position on loss of the pressure in conduit 46 due to breaking of a sample of the material tested by the apparatus 44 completes the structure 18.

Mechanism 48 includes the cylinder 54 connected at end 56 to the conduit 46 for receiving pressure therefrom and the piston 58 movable in the cylinder 54 in accordance with the pressure from conduit 46. The piston rod 60 is secured to the piston 58 for movement therewith and carries at one end thereof an abutment collar 62 for engagement with the solenoid carrying member 64 which is slidably mounted on the piston rod 60 for movement of the solenoid carrying member 64 over the parallel rod 66 along which the member 64 is also slidably movable. Structure including the fixedly positioned collar 68 and the collar 70 secured to the piston rod 60 and the spring 72 is provided at the other end of the piston rod 60 to bias the piston 58 in a lower position.

The structure 52 is operable to secure the solenoid carrying member 64 in a fixed position along rod 66 on actuation of the solenoid 74 and includes the solenoid 74 secured to the solenoid carrying member 64 having a spring urged plunger 76 operable to engage the rod 66 and hold the solenoid and solenoid carrying member 64 to which the end 50 of the chain 16 is secured at a predetermined location along the rod 66 when the solenoid 74 is deenergized. The limit switch 78 is provided to energize the solenoid 74 on upward movement of the piston rod 60.

The limit switch 78 is actuated by the end 79 of lever 80 which is pivotally mounted at 82. A friction shoe 84 is secured to the other end 86 of the lever 80. The friction shoe 84 is urged into engagement with the rod 60 by spring means 88 secured to the end 86 of the lever 80. Thus, when the rod 60 moves up, the limit switch 78 is actuated to make the circuit to the solenoid 74 and when the rod 60 moves down, the limit switch 70 is actuated to open the electrical circuit of the solenoid 74.

In operation of the compensating apparatus 18 to vary the quantity of additive in the weigh hopper 14 necessary to balance the balance beam 28, in accordance with the physical properties of sand to which the additive in the hopper 14 is to be added in accordance with the procedure in Patent No. 3,168,926, a pressure is produced in conduit 46 which will build up to a maximum required to rupture a specimen of sand in, for example, a compressive or a shear test. In response to the build up of pressure in conduit 46, pressure will build up in the chamber 90 below the piston 58 and the piston rod 60 will thus be moved in an up direction, as shown in FIGURE 1, against bias of spring 72 which may have a constant spring rate.

The abutment 62 on the piston rod 60 will thus engage the solenoid supporting member 64 and move the member 64 and the solenoid 74 in an up direction on the rod 66, whereby the portion of the chain 16 supported by the balance beam 28 will be varied in accordance with the pressure in the chamber 90. On initial upward movement of the piston rod 60 the lever 80 actuated by the friction shoe 84 will cause the solenoid 74 to be actuated due to closing of the limit switch 78 so that the armature 76 is withdrawn from rod 66.

When the same of sand producing the pressure in the conduit 46 and chamber 90 fails, as set forth in more detail in Patent No. 3,168,926, referenced above, the pressure in the chamber 90 will decrease rapidly and the rod 60 will move in a down direction. On initial downward movement of the piston rod 60 the switch 78 is opened due to the engagement of the friction shoe 84 with the piston rod 60. The solenoid 74 is thus deenergized and the solenoid 74, solenoid carrying member 64 and end 50 of the chain 16 are locked in an upper position on the rod 66 by means of the armature 76 which is spring loaded to engage the shaft 66 with a force to hold the two in a secured position.

The weight of additive to be weighed in the hopper 14 is thus determined by the weight of the chain 16 supported on the end of the balance beam 28, which as will be readily recognized is determined by the position of the solenoid supporting member 64 on the shaft 66.

After the additive weighed in the hopper 14 has been discharged therefrom, a second cycle of the weighing apparatus 10 is initiated by again testing a sample of sand to provide a pressure in the chamber 90. As the rod 60 begins to move up the switch 78 is again closed by the lever 80 in conjunction with the friction shoe 84 to energize the solenoid 74 and retract the armature 76. The solenoid supporting member 64 thus is permitted to lower due to gravity into contact with the rising abutment 62 on the rod 60 and the cycle is completed as before.

As indicated above, the balance 12 may also be compensated for various composition of the sand and temperature thereof by the composition compensating structure 20 and the temperature compensating structure 22, each of which includes a separate chain one end of which is secured to the balance beam 28. The compensating structures 18, 20 and 22 may be used separately in conjunction with the balance 12 or similar weighing means, if desired.

The composition compensating structure 20 is more particularly shown in FIGURE 2 and includes a servo motor set 94 including the slave motor 96 and the master motor 98. Power for actuating the motors 96 and 98 is supplied from a convenient power source 100. The slave motor 96 is connected through drive shaft 102 to the drum 104 to which the end 106 of the chain 24 is secured. The master motor 98 is connected to the manually actuated pointer to which shaft 108 is connected. The indicator 110 cooperates with the pointer 112 to indicate the composition of material for which the master motor 98 is set.

Thus, in operation an operator determines the composition of sand, for which it is desired to compensate the balance beam 28. The pointer 112 is then set to the composition indicated on the indicator 110 by manual rotation of the shaft 108. Rotation of the shaft 108 produces a similar or proportional rotation of the shaft 102 in accordance with the usual operation of the servo motor set 94. Thus the drum 104 is rotated about its axis to wind the end 106 of the chain 24 therearound or unwind the end 106 of the chain 24 in accordance with the direction of rotation of the shaft 108. The weight of the chain 24 carried by the balance beam 28 is therefore varied in accordance with the composition of the sand with which it is desired to mix additive from the weigh hopper 14.

In the temperature compensation structure 22 illustrated in FIGURES 4 and 5 a drum 114 is secured to the shaft 116 for rotation axially therewith to which the end 118 of the chain 26 is secured whereby the chain 26 is wrapped around the drum 14 on axial rotation thereof. Indicator 120 is positioned around the other end of the shaft 116 and cooperates with the pointer 122 which is connected to the shaft 116 for rotation therewith. The temperature of the sand to which the additive from the hopper 14 is to be added is measured in the batch hopper 124 positioned over the mixer 126 for mixing the batch of sand from the batch hopper 124 and additive from the hopper 14. The thermo-couple 128 is positioned in the batch hopper 124 for measuring the temperature of the sand therein and producing an electrical signal in accordance with the temperature. The electrical signal from the thermo-couple 128 is amplified through the amplifier 130 and is used to actuate the motor 132 to produce rotation thereof in accordance with the temperature sensed by the probe 128. The shaft 116 is then driven angularly a distance in accordance with the second temperature by the gear means 134 connected to the shaft 116 whereby the indicator 120 in conjunction with the pointer 122 will indicate the temperature sensed and the weight of the chain 26 supported by the balance beam 28 is varied in accordance with the sensed temperature.

While one embodiment of the present invention and modifications thereof have been considered in detail, it will be understood that other embodiments and modifications are contemplated. It is the intention to include all modifications and embodiments as are defined by the appended claims within the scope of the invention.

What I claim as my invention is:

1. Weighing apparatus for granular material or the like comprising a balance beam, means for pivotally mounting the balance beam centrally, means for receiving material to be weighed at one end of the balance beam, adjustable compensating means at the other end of the balance beam for changing the weight at which the beam balances, means for sensing any change in a property other than weight of a material and for automatically resetting said adjustable compensating means in accordance with the sensed change whereby the quantity of material being weighed necessary to balance the balance beam is varied in accordance with the property of the material.

2. Structure as set forth in claim 1 wherein the means for compensating the balance beam includes a relatively heavy flexible, linear member one end of which is connected to the other end of said beam.

3. Structure as set forth in claim 2 wherein said compensating means further includes means connected to the other end of the linear member for moving the other end of the linear member vertically toward and away from the other end of said balance beam transversely thereof in accordance with a pressure produced in accordance with the property of the material.

4. Structure as set forth in claim 3 wherein the means for moving the other end of the linear member includes a cylinder, a piston and piston rod positioned in and extending out of said cylinder, means for developing a pressure proportional to the property of the material, means connecting the pressure to the cylinder for moving the piston and piston rod within the cylinder a distance proportional to the pressure, slidable means positioned on the piston rod to which the other end of the linear member is secured for movement along the piston rod and means secured to the piston rod for moving the slidable means with the piston rod in a direction toward the other end of the balance beam.

5. Structure as set forth in claim 4 and further including a second rod positioned adjacent to and parallel with the piston rod along which the slidable member supporting the other end of the linear member is slidable, means operable on energization to secure the slidable member to the second rod and means operably associated with the piston rod for energizing the means to secure the slidable member to the second rod on movement of the piston rod in one direction and for deenergizing the last mentioned means on movement of the piston rod in the opposite direction.

6. Structure as set forth in claim 2 and further including means for manually adjusting the compensating means in accordance with the composition of the material.

7. Structure as set forth in claim 6 wherein the compensating means includes a drum to which the other end of the flexible, linear member is secured whereby the flexible, linear member is wound around the drum on axial rotation thereof, a servo slave motor connected to the drum for rotating the drum axially, a servo master motor connected to the slave motor for determining the rotation of the slave motor, and means for rotating the master motor in accordance with the composition of the material.

8. Structure as set forth in claim 1 wherein the means for compensating the balance beam includes means for vertically moving the other end of the linear member transversely of the other end of the balance beam in accordance with the temperature of the material.

9. Structure as set forth in claim 8 wherein the means for vertically moving the other end of the linear member comprises a rotatable drum means connecting the other end of the linear member to the rotatable drum for winding on the rotatable drum on axial rotation thereof, means for sensing the temperature of the material to be weighed and producing an electrical signal in accordance therewith, motor means for receiving the produced signal and connected to the drum for rotating the drum in accordance with the produced signal.

10. Structure as set forth in claim 2 and further including means for varying the weight of the linear member supported by the other end of the balance beam in accordance with a pressure produced in accordance with a physical property of the material, in accordance with the composition of the material to be weighed and in accordance with the temperature thereof.

References Cited
UNITED STATES PATENTS

| | | | |
|---|---|---|---|
| 2,384,228 | 9/1945 | Allen | 177—114 |
| 2,607,579 | 8/1952 | Noble | 177—164 |
| 2,650,057 | 8/1953 | Goland et al. | 177—210 X |
| 2,765,160 | 10/1956 | Dietert et al. | 177—214 X |
| 2,791,120 | 5/1957 | Dietert et al. | 73—432 |
| 2,968,463 | 1/1961 | Noble | 177—70 X |

RICHARD B. WILKINSON, *Primary Examiner.*
ROBERT S. WARD, JR., *Assistant Examiner.*